United States Patent Office 2,778,848
Patented Jan. 22, 1957

2,778,848

PREPARATION OF ACRYLATES

Andrew Neuman, North Hills, Harry T. Neher, Bristol, and Edward H. Specht, Philadelphia, Pa., assignors to Rohm & Haas Company, Philadelphia, Pa., a corporation of Delaware No Drawing. Application January 21, 1953, Serial No. 332,506

12 Claims. (Cl. 260—486)

This invention deals with the preparation of esters of acrylic acid by reacting together a monohydric alcohol of at least three carbon atoms, carbon monoxide, nickel carbonyl, acetylene, and water.

This application is a continuation-in-part of our application Serial No. 239,618, filed July 31, 1951, now abandoned, which is in turn a continuation of our application Serial No. 173,482, filed July 12, 1950, now U. S. Patent No. 2,582,911, issued January 15, 1952.

It has been shown that at temperatures of about 40° C. there can be reacted acetylene, nickel carbonyl, an acid, and an alcohol to form acrylic esters of the alcohol. Various by-products inevitably form in this reaction, such as propionates, vinyl-propionates, and other compounds in the formation of which the hydrogen which should theoretically be evolved is consumed. In another approach it was found that acetylene, carbon monoxide, and some alcohols can be reacted at 150°–180° C. under high pressure in the presence of such nickel salts as nickel iodide or bromide. At these temperatures the nickel salt is depleted, by reaction with carbon monoxide, organic halogen compounds are formed, acetylene is decomposed and also polymerized, and hazards and difficulties due to handling acetylene at high pressures and temperatures are encountered. Furthermore, it has been found that reaction of tertiary alcohols and allylically unsaturated alcohols under these conditions is unsatisfactory or even impracticable.

Even at lower temperatures the stoichiometric reaction of tertiary alcohols or allylically unsaturated alcohols, acetylene, nickel carbonyl, and acid is not fully satisfactory. Acid tends to promote dehydration of the tertiary alcohols and the reaction of allylically unsaturated alcohols does not always run smoothly and regularly. If a mixture of an alcohol, nickel carbonyl, and an acid is treated with a mixture of acetylene and carbon monoxide in required proportions, no reaction ensues, In our parent case, we have shown, however, that the reaction of an alcohol, acetylene, and carbon monoxide at moderate temperatures can be effected by imposing it upon the stoichiometric reaction of acetylene, nickel carbonyl, alcohol, and acid. In effect the two reactions go on simultaneously in the same reaction mixture.

It has now been found that a further improvement is obtained by first effecting the reaction of a monohydric alcohol of at least three carbon atoms, particularly of a tertiary or allylically unsaturated alcohol, acetylene, and nickel carbonyl in the presence of a lower monocarboxylic acid such as acetic or acrylic acid and then, while this first reaction is being carried on, bringing into the reacting mixture and there reacting together one of the said alcohols, acetylene, carbon monoxide, nickel carbonyl, and water to form an acrylic ester of said alcohol and continuing the reaction of these five materials. It will be noted that in this improvement addition of acid is discontinued as soon as reaction of the above five materials has been established.

This is of decided and peculiar advantage for forming acrylic esters of the tertiary alcohols and also of allylically unsaturated alcohols. The method may, however, be applied to other alcohols, such as alkanols of three to twelve carbon atoms, to ether alcohols, and to alicyclic alcohols. It is a highly effective method when terpenic alcohols are reacted. In general the method of this invention can be applied to any alcohol of the formula ROH, where R is an alcohol residue of three to twelve carbon atoms, particularly a hydrocarbon residue.

The process is advantageously applied to the allylically unsaturated alcohols, such as allyl, 2-methallyl, 2-ethallyl, 2-butallyl, 2-phenylallyl, 2-chloroallyl, neopentylallyl, crotyl, 3-ethallyl, 3-butallyl, cinnamyl, and the like, particularly those of not over twelve carbon atoms. Many of these may be represented by the formula

$$R^1CH=CR^2—CH_2OH$$

where $R^1$ represents hydrogen, an alkyl group, particularly one of not over four carbon atoms, or a phenyl group and $R^2$ represents hydrogen, phenyl, chlorine, or an alkyl group, particularly one of not over five carbon atoms.

The process is also advantageously applied to tertiary alcohols. Of these the readily available ones are tertiary butyl and tertiary amyl.

There may also be reacted other alcohols, such as isopropyl, n-butyl, hexyl, octyl, 2-ethylhexyl, isononyl, dodecyl, and so on, although usually without marked advantage. On the other hand cyclic alcohols are often desirably reacted by the process of this invention to yield acrylic ester. Mixed terpineols may be used or single alcohols such as α-terpineol. This process can also be successfully applied to cyanalkanols, chloroalkyl alcohols, ether alcohols, glycols, and other alcohols having a functional group in addition to the hydroxyl group. For any given alcohol there can be readily found the best proportions, temperatures, or adjustment for operating the reaction of this invention at a high level of carbon monoxide utilization.

Theoretically the amount of water required is equivalent to the nickel carbonyl. Practically it has been found desirable to operate ordinarily using about 150% to 400% of this theoretical quantity of water. In the case of such alcohols as isobutyl, octyl, decyl, and dodecyl 200% to 600% of theory is desirable to carry the process at a good level of carbon monoxide utilization.

The ratio of carbon monoxide to nickel carbonyl should be between 20:80 and 70:30 with reference to the CO or carbonyl supplied by each of these substances. Preferably 40 to 60 mole percent of the total CO is supplied by the carbon monoxide.

Addition of acetylene is proportioned to the total CO or total carbonyl from both carbon monoxide and nickel carbonyl. Operative proportions of acetylene should best be within a tenth mole of theory, i. e., from about 0.9 mole to 1.1 moles of acetylene per mole of total CO. A ratio from 1.02:1 to 1.05:1 is usually optimum.

It will be noted that acid is actually added only at the start of the operation. There can be used any acid which reacts with nickel carbonyl in the reaction mixture to form a nickelous salt and which at the same time makes available for reaction the carbonyl therefrom. The acid may be a lower monocarboxylic acid, acids up to four carbon atoms being effective in forming nickel salts and liberating the carbonyl content of the nickel carbonyl. It is generally best to use acrylic acid or acetic acid. Other organic acids such as propionic, methacrylic, or butyric can be used, particularly when the alcohol being used is allylically unsaturated. With other alcohols a reactive strong acid may be chosen. The cheapest and best of these is hydrochloric acid. This strong acid may be used at the start with primary, secondary, or even tertiary alcohols, although strong acids tend to promote dehydration of some tertiary alcohols.

Acid is supplied only long enough to cause the stoichiometric reaction of acid, nickel carbonyl, alcohol, and acetylene. After this reaction has become established, the reaction of nickel carbonyl, carbon monoxide, alcohol and water is brought about and addition of acid is discontinued.

An excess of alcohol with reference to either total CO or acetylene is advantageous, but not essential. Excess alcohol serves as a diluent and can be recovered from the reaction mixture. Usually the alcohol is used in a proportion equivalent to the total CO up to 100% excess, although larger excesses may be used when desired.

There may also be used an inert organic solvent, such as acetone, methyl ethyl ketone, dioxane, benzene, toluene, and mixtures of such solvents.

Acetylene and carbon monoxide used in the process should be at least low in oxygen and preferably essentially free of oxygen. For stable, continuous operation these gases should contain less than one half percent of oxygen. Acetylene should be relatively free of lower valence compounds of phosphorus and arsenic and without appreciable sulfur content. Purification by conventional methods is sufficient to yield a satisfactory, non-contaminating gas. Inert gases such as carbon dioxide, nitrogen, or hydrogen act merely as diluents. Commercial sources of acetylene or carbon monoxide may thus be used with no more than simple precautions.

The temperature of the reaction mixture may be between 30° and 90° C. and is preferably between 50° and 70° C. Cooling is usually necessary to maintain the reaction mixture within the most desirable ranges of temperature.

The reaction takes place without the need of added pressure. In some cases reaction proceeds actively enough to cause the pressure within the reactor to be below atmospheric. There are other situations where the pressure may be advantageously maintained above atmospheric.

At the start of the reaction it is desirable to sweep air from the reaction vessel with an inert gas, such as nitrogen. This gas is, of course, soon displaced with acetylene and the reaction mixture is thereafter kept under an atmosphere composed of acetylene and carbon monoxide.

The reaction vessel is charged at the start with alcohol, solvent, if used, nickel carbonyl, and acid. Acetylene is run into the charge. Reaction may begin spontaneously or be initiated by warming the mixture. With start of the reaction there is a rise in temperature and development of color. Alcohol, nickel carbonyl, acid, and acetylene may then be passed into the mixture in about stoichiometric proportions or with alcohol or water in excess, as has been indicated, to establish the stoichiometric reaction. Thereupon carbon monoxide is introduced and the addition of acid is discontinued. The proper rates of flow are reached and the reaction continued with alcohol, water, acetylene, carbon monoxide, and nickel carbonyl.

If the reaction is run batchwise, the flow of materials is discontinued at the proper time. There is usually some nickel carbonyl in the reaction mixture. This can be consumed by continuing the flow of acetylene, which together with excess alcohol and acid (acrylic acid may be added, if necessary) forms ester. If the reaction is run continuously, reaction mixture is taken off in proportion to the added materials. This mixture may likewise be treated to consume the last trace of nickel carbonyl.

The reaction mixture is worked up, conveniently by washing with water to separate ester and nickel salt. The nickel can be recovered and reconverted to nickel carbonyl which is returned to the process. The part containing the ester is appropriately worked up, usually through distillation.

Thus, the process of this invention is carried out by first reacting a given alcohol, acetylene, nickel carbonyl, and acid, particularly a lower monocarboxylic aliphatic acid, a reaction here termed the stoichiometric reaction, then adding to this reacting mixture and there reacting between 30° and 90° C. the said alcohol, carbon monoxide, acetylene, nickel carbonyl and water. The reaction is advantageously run continuously.

The following examples are illustrative of this invention. Parts are by weight.

*Example 1*

The reactor system was so arranged that all reactants were fed continuously into the reaction mixture stream just prior to its passage through a pump which rapidly circulated the mixture through a water-jacketed tube, into a surge vessel, and back to the pump. An initial volume (ca. 1800 cc.) of reaction mixture from a previous run, made up of 782 grams of tertiary butyl acrylate, 135 grams of acrylic acid, 576 grams of tertiary butanol, 186 grams of nickel acrylate, the remaining balance of 96 grams consisting of water and high boiling organic residues, was charged to the empty reactor. This allowed sufficient volume for circulation. The system was rendered substantially air-free by passing through it about 0.5 cubic foot of nitrogen. The circulation pump was started and reactant feeds were introduced at the following rates: acetylene, 49.4 grams per hour; nickel carbonyl, 82.1 grams per hour; and tertiary butanol, 138.5 grams per hour. After twenty minutes, water was introduced to the reaction mixture stream at the rate of 29.2 grams per hour, and additional tertiary butanol was simultaneously introduced to correspond with the total feed rate of 308 grams per hour. The above feeds, at their respective rates, were continued for twenty minutes when the reaction mixture became a deep brown color. The acetylene rate was then increased to 94.1 grams per hour and carbon monoxide gas was introduced at the rate of 43.4 grams per hour and continued at this level for ten minutes. Then the acetylene rate was increased to 103.8 grams per hour and the rate of flow of carbon monoxide to 53.2 grams per hour. After ten minutes at these rates the acetylene was increased to 115.3 grams per hour and carbon monoxide gas to 65 grams per hour and flow of gases was maintained at this level for twenty minutes at which time the final rates were adjusted to supply acetylene at 130 grams per hour and carbon monoxide gas at 80.2 grams per hour. Reaction was maintained for a period of about six hours until the nickel carbonyl feed reservoir was emptied. During this period the temperature of the reaction mixture was maintained at 70°–74° C. by cooling. After the reactor became filled to a predetermined volume, the level was held constant by continuous withdrawal from the surge vessel. The pressure in the system was essentially atmospheric with the prevailing reactant ratios (molar) consistently corresponding to 69% excess water, 9% excess tertiary butanol, and 4.5% excess acetylene based on carbonyl or carbon monoxide equivalent to the nickel carbonyl and carbon monoxide gas. A total of 5124 grams of reaction mixture, containing suspended nickel acrylate, was obtained. After removal of unreacted nickel carbonyl by passing a stream of 31 grams per hour of acetylene, the product was filtered. The filtrate was washed with about 5800 grams of water. Fractional distillation of the washed organic material and steam distillation of the aqueous layer, to which the nickel salt filter cake was added, gave a total of 2227 grams of ester, 782 grams of which was precharged, and 636 grams of "free" acrylic acid, 135 grams of which was precharged. A portion of the ester distillate was washed with sodium carbonate solution, dried and redistilled. The purified ester was found to have the following properties:

|  | Found | t-Butyl Acrylate |
|---|---|---|
| $N_D^{20}$ | 1.4100 | 1.4090 (literature). |
| B. P., mm | 54–55° C./mm | 122° C./760 mm. (literature). |
| Sap. No | 439 | 438.3 (theory). |
| Acid No | 0 | 0 (theory). |

*Example 2*

An apparatus was constructed with a pump, a vertical tube surrounded with a jacket through which cooling water could be circulated, and a surge vessel. The pump was arranged to receive reactants and pass them into the vertical tube from which they flowed to the surge vessel. The surge vessel was arranged so that a constant volume remained in it and reaction mixture therefrom overflowed to a receiver.

At the start the reactor was flushed with nitrogen and the tube was charged with 1865 parts of reaction mixture from a previous run, this mixture containing tertiary butyl acrylate, tertiary butanol, acrylic acid, nickel acrylate, water, and organic residue of a higher boiling point range than that for tertiary butyl acrylate. The pump was started and reactants were introduced into the reaction system as follows: acetylene at the rate of 49.4 parts by weight per hour; nickel carbonyl at the rate of 81 parts per hour; and tertiary butanol at the rate of 138.5 parts per hour. After twenty minutes, water was introduced to the reaction mixture at the rate of 30.1 parts per hour and additional tertiary butanol was introduced to correspond with the total rate of 422 parts per hour. When the reaction mixture changed to a deep brown color after 15 minutes at the described reactant rate, the acetylene rate was increased to 94.1 parts per hour and carbon monoxide gas was introduced at the rate of 43.4 parts per hour. Reactant rates were maintained at these levels for ten minutes and then the acetylene feed was increased to 103.8 parts per hour and carbon monoxide gas to 53.2 parts per hour and then further increased after ten minutes to an acetylene rate of 115.3 parts per hour and a carbon monoxide rate of 65 parts per hour. The final rates of acetylene (130 parts per hour) and carbon monoxide gas (80.2 parts per hour) were adjusted twenty minutes after the previous rate adjustments. Reaction was maintained for a period totalling about six hours at which time the nickel carbonyl supply was exhausted. During this period the temperature of the reaction mixture was maintained at 75°–76° C. by cooling. The pressure in the reactor system was essentially atmospheric.

A total of 5708 parts reaction mixture was collected and then treated with additional acetylene to react with the unreacted nickel carbonyl. The resulting mixture was washed with water and the respective layers were distilled. A total of 1783 parts of tertiary butyl acrylate was obtained. This corresponds to a yield of 66.2% based on the total carbon monoxide from nickel carbonyl and carbon monoxide gas less that theoretically required to supply acrylic acid for the corresponding nickel acrylate. The balance of the carbon monoxide was mainly accounted for as acrylic acid.

*Example 3*

The same system employed in the preparation of t-butyl acrylate was used with allyl alcohol in place of t-butanol for the preparation of allyl acrylate.

The reactor system was charged with an initial volume of reaction mixture consisting of 863 parts of allyl acrylate, 217 parts of acrylic acid, 610 parts of allyl alcohol, 237 parts of nickel acrylate, and 48 parts consisting of water and high boiling organic residue from a previous preparation. After the system had been flushed with nitrogen, the circulation pump was started and the reactants were introduced. The rates of addition of the reactant were: acetylene, 49.4 parts per hour; nickel carbonyl, 81 parts per hour; and allyl alcohol, 152 parts per hour. After twenty minutes water was introduced at the rate of 30.4 parts per hour and the allyl alcohol feed rate was increased to a total of 360 parts per hour. The reaction mixture became a dark color after about 30 minutes, when the acetylene rate was increased to 94.1 parts per hour. Simultaneously carbon monoxide was introduced at a rate of 43.4 parts per hour. The feed rate of acetylene and carbon monoxide were simultaneously increased at intervals to a maximum rate of 130 parts per hour and 80.2 parts per hour respectively. Reactant rates were continued at the following molar ratios, based on total carbonyl or carbon monoxide from both the nickel carbonyl and the carbon monoxide gas:

Carbon monoxide gas _____ 0.598
Water _____ 1.76
Allyl alcohol _____ 1.62
Acetylene _____ 1.045

A typical schedule for general operating procedure for start-up and for increasing the reactant ratio was:

| Total Elapsed Time, Hours | Operation (Rates as parts per hour) |
|---|---|
| 0 | Start feeds: $Ni(CO)_4$, 81; Allyl alcohol, 152; $C_2H_2$, 49.4. |
| 0.33 | Introduce $H_2O$ feed, 30.4; Increase Allyl alcohol to 360. |
| 0.82 | Introduce CO gas, 43.4; Increase $C_2H_2$ to 94.1. |
| 0.98 | Increase CO gas to 53.2; Increase $C_2H_2$ to 103.8. |
| 1.15 | Increase CO gas to 65.0; Increase $C_2H_2$ to 115.3. |
| 1.48 | Increase CO gas to 80.2; Increase $C_2H_2$ to 130. |
| 5.92 | Shut down feeds, the $Ni(CO)_4$ feeder reservoir being empty. |

The temperature of the reaction mixture was maintained at 69–70° C. by cooling. The system was operated essentially at atmospheric pressure with the liquid level maintained at a predetermined volume by continuous withdrawal of reaction mixture which contained suspended nickel acrylate. The total reaction mixture collected was 5710 parts which was treated with acetylene for removal of unreacted nickel carbonyl and then washed with a total of 5700 parts of water. A total of 1468 parts of allyl acrylate and 441 parts of acrylic acid were obtained, allowing for ester and acid precharged.

A portion of the ester distillate was purified by washing with a solution of potassium carbonate and water and redistilling. The main portion of the distillate ester, collected at 55.5°–57° C. at 60 mm. mercury pressure was found to have the following properties:

|  | Found | Allyl Acrylate |
|---|---|---|
| Saponification No | 499.6 | 500.4 (theoretical value). |
| Acid No | 0 | 0 (theoretical value). |
| Bromine No | 34.06 | 35.7 (theoretical value). |
| $N_D^{20}$ | 1.4311 | 1.4320 (from the literature). |

*Example 4*

A reaction vessel was equipped with a stirrer, a cooling coil, a thermometer, an inlet tube at the bottom for introduction of liquid and gaseous feeds, an outlet tube at the top for vent gases and an overflow pipe to permit continuous withdrawal of reaction mixture.

The reaction system was swept with nitrogen and charged with 362 parts of n-butyl alcohol, 36 parts of acrylic acid and 36 parts of water. Reactants were then introduced as follows: acetylene, at the rate of 27.3 parts per hour; nickel carbonyl, at the rate of 42.6 parts per hour, introduced as a 31.2% solution in n-butyl alcohol. After twelve minutes reaction began as shown by formation of a brown color in the mixture, a sudden temperature rise and complete absorption of acetylene. The temperature was allowed to rise until it had reached 55° C., at which level it was maintained thereafter by cooling. At twenty minutes the acetylene rate was increased to 41.1 parts per hour and carbon monoxide was introduced at the rate of 14.0 parts per hour (33% carbon monoxide utilization). At ten-minute intervals the rates of acetylene and carbon monoxide feeds were increased until at fifty minutes these rates were 54.6 and 28.0 parts per hour, respectively (50% carbon monoxide utilization). At sixty minutes water was introduced at the rate of 36 parts per hour and was continued at this rate for the remainder of the reaction period. At 120 minutes the acetylene and carbon monoxide feed rates were increased to 60.6 and 34.2 parts per hour, respectively; at 150 minutes they were increased to 68.1 and 42.0 parts per hour, respectively; and at 210 minutes, to 78.0 and 52.1 parts per hour, respectively. These final rates corresponded to 65% carbon monoxide utilization, i. e., 65% of the total available carbon monoxide was supplied as carbon monoxide gas, the remaining 35%, as nickel carbonyl. At 240 minutes an additional supply of n-butyl alcohol was introduced at the rate of 169 parts per hour, this rate being maintained for the remainder of the reaction period. At 300 minutes the reaction mixture had reached the top of the overflow tube and continuous withdrawal was started. At 360 minutes all reactant feeds were discontinued and the reactor was drained.

Subsequently, the reaction vessel was swept out with nitrogen and charged with the reaction mixture obtained above. Reactants were introduced as follows: acetylene, 27.3 parts per hour; nickel carbonyl, 42.6 parts per hour, as a 31.2% solution in n-butyl alcohol; and water, 36 parts per hour. At thirty five minutes the reaction began; immediately the acetylene feed rate was increased to 45.5 parts per hour and carbon monoxide was introduced at the rate of 23.0 parts per hour. Thereafter, at five-minute intervals the gas feed rates were increased in stages until at fifty minutes the rates were: acetylene, 78.0 parts per hour and carbon monoxide, 52.1 parts per hour. These rates correspond to a 65% carbon monoxide utilization. At sixty minutes an additional n-butyl alcohol feed was started at the rate of 183 parts per hour and the carbon monoxide utilization was raised to 67% by increasing the acetylene and carbon monoxide feed rates to 82.0 and 56.0 parts per hour, respectively. After a period of alternately high and low vent rates, indicative of instability, absorption of gases ceased at 111 minutes; the carbon monoxide and alcohol feeds were shut off and the acetylene feed was reduced to 27.3 parts per hour. At 117 minutes the reaction began again. The acetylene feed was raised to 78.0 parts per hour, carbon monoxide was introduced at 52.1 parts per hour, and the additional alcohol feed was restored at 169 parts per hour. These rates, corresponding to 65% carbon monoxide utilization, were maintained for the remainder of the reaction period. As before, the temperature was held at 55° C. with cooling. Withdrawal of reaction mixture from the overflow pipe was continuous throughout the reaction period.

At 360 minutes the nickel carbonyl and alcohol feeds were shut off. At 380 minutes the carbon monoxide feed was shut off and five minutes later absorption of acetylene had ceased. The reaction mixture, a clear green solution with a little solid nickel salt present, was drained from the reaction vessel. Previously withdrawn reaction mixture was returned to the reaction vessel and acetylene was passed in until absorption of acetylene and exothermic reaction ceased.

The reaction mixture was washed with water to remove nickel salts, with sodium carbonate solution to remove acidity and was then distilled. After a forerun which contained water, n-butyl alcohol and some n-butyl acrylate, the main fraction containing essentially pure n-butyl acrylate was taken at 86°–87° C. under a pressure of 100 mm.

*Analyses.* — Saponification number: calculated, 438; found, 441. Acid number: calculated, 0.0; found, 2.9. Bromine number: calculated, 15.6; found, 15.0. The yield of n-butyl acrylate, including that recoverable from the forerun, was 68.9%, based on the total carbon monoxide available for ester formation.

*Example 5*

The reaction system used was the same as that described for the preparation of n-butyl acrylate. The reaction system was swept with nitrogen and charged with 360 parts of sec.-butyl alcohol, 10 parts of acrylic acid, and 18 parts of water. The nickel carbonyl feeder was charged with a solution containing 31.5% nickel carbonyl (by weight) in sec.-butyl alcohol.

Reactants were introduced at the following rates: acetylene, 27.3 parts per hour and nickel carbonyl, 42.6 parts per hour. The reaction began after thirteen minutes, indicated by development of a brown color, a slow rise in temperature and a gradual decrease in the rate of vent gas evolution. The temperature of the mixture, originally at 28° C., was allowed to rise until it reached 55° C., where it was maintained throughout the remainder of the reaction period. Thirty minutes after the feeds were started, the acetylene feed rate was increased to 41.1 parts per hour and carbon monoxide was introduced at the rate of 14.0 parts per hour. At sixty minutes water was introduced at the rate of 18 parts per hour and was maintained at this rate for the remainder of the reaction period. The feed rates of acetylene and carbon monoxide were periodically increased at approximately hourly intervals until the final rates of 68.1 and 42.0 parts per hour, respectively, were reached at about 300 minutes; these rates corresponded to a carbon monoxide utilization of 60%. After operating for one hour at this level, the reaction was discontinued by shutting off all feeds. It was subsequently re-started by supplying acetylene at the rate of 27.3 parts per hour; nickel carbonyl at 42.6 parts per hour (in 31.5% solution, as described above), and water at 18 parts per hour. The reaction began within fifteen minutes and at thirty minutes the acetylene feed rate was increased to 45.5 parts per hour and carbon monoxide was introduced at the rate of 18.8 parts per hour. These rates were increased rapidly in stages until at sixty minutes the rates were 68.1 parts of acetylene per hour and 42.0 parts of carbon monoxide per hour, corresponding to 60% carbon monoxide utilization. Additional alcohol was then supplied at the rate of 129 parts sec.-butyl alcohol per hour. Withdrawal of reaction mixture from the top of the overflow pipe began and was carried out continuously for the remainder of the reaction period. After five hours at the above conditions, the nickel carbonyl and alcohol feeds were shut off. Twenty minutes later carbon monoxide ceased to be absorbed and the feed was shut off. In an additional ten minutes exothermic reaction ceased and acetylene was no longer absorbed. Unreacted nickel carbonyl remaining in the previously withdrawn reaction mixture was used up by passing in acetylene until no further absorption occurred.

The reaction mixture was washed with water and with sodium carbonate solution. The organic layer was distilled and after removal of a forerun containing water, sec.-butyl alcohol and some sec.-butyl acrylate, a main fraction was taken, boiling at 58°–58.5° C. under a pressure of 50 mm. This material was sec.-butyl acrylate: saponification number, 442; acid number, 0.0; bromine number, 14.95; calculated values are: 438, 0.0 and 15.6, respectively. The total yield of sec.-butyl acrylate was 67.0%, based on the total carbon monoxide available for ester formation.

*Example 6*

The reaction system, the same as that used in the preparation of n-butyl arcylate, was swept with nitrogen and charged with 370 parts of n-octyl alcohol, 36 parts of acrylic acid, and 36 parts of water. The nickel carbonyl feeder was charged with a solution containing 30.8% by weight nickel carbonyl in n-octyl alcohol.

The reaction was started by introducing reactants at the following rates: acetylene, 27.3 parts per hour and nickel carbonyl, 42.6 parts per hour. At ten minutes a brown color appeared in the mixture, the temperature rose, and acetylene was completely absorbed. At twenty minutes carbon monoxide was introduced at the rate of 14.0 parts per hour with a simultaneous increase in the acetylene rate to 41.1 parts per hour; these rates corresponded to 33% carbon monoxide utilization. At ten-minute intervals the acetylene and carbon monoxide feed rates were increased to the following stages:

| | Parts per hour |
|---|---|
| Acetylene | 45.5 |
| Do | 49.6 |
| Do | 54.6 |
| Carbon monoxide | 18.8 |
| Do | 23.0 |
| Do | 28.0 |

The temperature, initially at 24° C., was allowed to rise during this period until it reached 55° C., where it was maintained thereafter by cooling.

Beginning at sixty minutes water was supplied at the rate of 36 parts per hour and this supply was continued for the remainder of the reaction period. At 120 minutes the gas feed rates were again increased to 60.6 parts of acetylene per hour and 34.2 parts of carbon monoxide per hour. At 150 minutes additional alcohol was supplied at the rate of 240 parts of n-octyl alcohol per hour. Four hours after starting the reaction continuous withdrawal of reaction mixture was started from the top of the overflow tube. The feeds were continued for a total reaction period of nine hours and were then shut off. Nickel carbonyl remaining in the reaction mixture was used up by passing in acetylene until absorption of acetylene and exothermic reaction ceased.

The reaction mixture, a bright green slurry, was washed with water and with sodium carbonate solution and was then distilled. The main fraction distilled at 77°–77.5° C./2.5 mm. It had a saponification number of 302 (calculated, 305) and an acid number of 0.0. The total yield of n-octyl acrylate was 73.7%, based on total carbon monoxide available for ester formation.

*Example 7*

The reaction system, the same as that described for the preparation of n-butyl acrylate, was swept with nitrogen and charged with 415 parts of 2-ethoxyethanol, 36 parts of acrylic acid, and 72 parts of water. The nickel carbonyl feeder was charged with a 28.4 weight percent solution of nickel carbonyl in 2-ethoxyethanol.

Reactant feeds were started at the following rates: acetylene, 27.3 parts per hour; nickel carbonyl, 42.6 parts per hour. Exothermic reaction began in eleven minutes accompanied by appearance of a brown color in the mixture and absorption of acetylene. The temperature, initially at 27° C., was allowed to rise to 55° C. where it was maintained by cooling. Carbon monoxide was introduced at twenty minutes along with additional acetylene and periodic increases were made in the gas feed rates according to the following schedule:

| Elapsed Time, Minutes | Acetylene, Parts Per Hour | Carbon Monoxide, Parts Per Hour | Carbon Monoxide Utilization, Percent |
|---|---|---|---|
| 20 | 41.1 | 14.0 | 33 |
| 30 | 45.5 | 18.8 | 40 |
| 40 | 49.6 | 23.0 | 45 |
| 50 | 54.6 | 28.0 | 50 |
| 120 | 60.6 | 34.2 | 55 |
| 180 | 68.1 | 42.0 | 60 |

At 240 minutes water was supplied at the rate of 18 parts per hours, continuing for the remainder of the reaction period. An alcohol feed, in addition to that supplied with the nickel carbonyl, was started and maintained at the rate of 156 parts of 2-ethoxyethanol per hour. Continuous withdrawal of reaction mixture from the overflow tube was started at 300 minutes. The reaction was continued for a total reaction time of twelve hours, at which time the reactant feeds were shut off. Removal of unreacted nickel carbonyl in the withdrawn reaction mixture was accomplished by passing acetylene into the mixture until no further absorption of acetylene occurred and exothermic reaction ceased.

The reaction mixture, a deep green solution with some light green nickel salt suspended therein, was washed three times with volumes of water equal to the volume of the original reaction mixture. By this means most of the unreacted 2-ethoxyethanol was removed along with the nickel salt. Sodium carbonate was added to the last wash water to remove acidity. Distillation of the washed organic layer gave a very small forerun, followed by a main fraction of essentially pure 2-ethoxyethyl acrylate, boiling point 63°–63.5° C. under a pressure of 10 mm.; saponification number, 388, calculated, 389; acid number, 0.0, calculated 0.0; bromine number, 13.5, calculated, 13.9. Additional amounts of 2-ethoxyethyl acrylate were recovered by distillation of the aqueous wash water. The total yield of 2-ethoxyethyl acrylate was 75%, based on total carbon monoxide available for ester formation.

*Example 8*

A series of five reactions was carried out with reaction periods of five to six hours each. After the first reaction the material charged to the reaction system was an aliquot of the reaction mixture from the preceding reaction. Aliquots of the second and succeeding reactions were worked up for recovery of allyl acrylate.

The following table summarizes the gas feed rates at the various stages of carbon monoxide utilization used in this series:

| Carbon Monoxide Utilization, Percent | Parts Per Hour | |
|---|---|---|
| | Acetylene | Carbon Monoxide |
| 0 (stoichiometric) | 27.3 | 0.0 |
| 40 | 45.5 | 18.8 |
| 50 | 54.6 | 28.0 |
| 60 | 68.1 | 42.0 |
| 65 | 78.0 | 52.1 |
| 67 | 82.0 | 56.0 |

The nickel carbonyl feed rate in this series was 42.6 parts per hour; the nickel carbonyl was supplied as a 30.0 weight percent solution in allyl alcohol. Water was supplied at the rate of 18 parts per hour. The temperature was maintained at 55° C. with cooling.

Pertinent details for the separate reactions are summarized below:

*First reaction period, six hours.*—The reaction system, the same as that described for the preparation of n-butyl acrylate, was flushed with nitrogen and charged with 380 parts of allyl alcohol, 10 parts of acrylic acid, and 18 parts of water.

The reaction was initiated in the usual manner by feeding acetylene and nickel carbonyl at the rates indicated above. An exothermic reaction, with the usual brown coloration, began in fifteen minutes. Carbon monoxide and additional acetylene were introduced at thirty minutes, the feeds rates corresponding to 50% carbon monoxide utilization. At the end of four hours the reaction was sufficiently stable for 50% carbon monoxide utilization to be maintained. The reaction remained at this level for two hours at which time the feeds were shut off. The entire reaction mixture, a deep green solution, was saved for the next reaction.

*Second reaction period, five hours.*—The reaction system, after flushing with nitrogen was charged with the entire reaction mixture obtained as described above.

Acetylene and nickel carbonyl were passed in at the specified rates. The exothermic reaction was slow in starting and was aided by passing steam through the coils to raise the temperature from the initial 25° C. up to 35° C. The reaction began at fifty-five minutes. At sixty minutes carbon monoxide was introduced with simultaneous increase in the feed rate of acetylene, both rates then corresponding to 40% carbon monoxide utilization. At ten-minute intervals the carbon monoxide utilization was advanced to 50, 60 and 65% and after a thirty-minute interval to the final utilization of 67% which was held for the remainder of the reaction period; the gas flow rates at these various stages have been summarized above. At the end of five hours the feeds were shut off. An aliquot of the reaction mixture was reserved for use as the initial charge for the next reaction; the remainder was made free of nickel carbonyl by passing in acetylene until absorption and exothermic reaction ceased. This portion was then washed with water to remove nickel salts and most of the unreacted allyl alcohol and with sodium carbonate solution to remove acidity. The resulting organic layer was then distilled and after a small forerun a main fraction of essentially pure allyl acrylate was taken distilling at 55.5°–57° C./60 mm. Saponification number, 503, calculated, 500; acid number, 2.3, calculated 0.0; bromine number, 34.2, calculated 35.7. Some additional allyl acrylate was recovered by distillation of the aqueous wash liquors.

*Third, fourth and fifth reaction periods, five hours each.*—In each case the reaction system was charged with an aliquot of reaction mixture from the immediately preceding reaction. Exothermic reaction began within twenty to thirty minutes and the carbon monoxide utilization was then advanced through the stages, 40, 50, 60 and 65% at ten-minute intervals and was increased to 67% after a thirty-minute interval. At the end of the second reaction, the very large excess of allyl alcohol, resulting from the initial charge of allyl alcohol at the beginning of the series, had been reduced to the desired level, i. e., a 50% excess, based on the total carbon monoxide available for ester formation. Thus, in the latter three reaction periods it was necessary to provide allyl alcohol in addition to that already being fed with the nickel carbonyl. The rate of alcohol feed used was 118 parts per hour in these three reaction periods.

The yields of allyl acrylate in this series were as follows, the yields being based on total carbon monoxide available for ester formation:

| | Percent |
|---|---|
| Second reaction | 66 |
| Third reaction | 72 |
| Fourth reaction | 71 |
| Fifth reaction | 73 |

*Example 9*

The reaction system, the same as that described for the preparation of n-butyl acrylate, was swept with nitrogen and charged with 382 parts of methallyl alcohol, 10 parts of acrylic acid, and 18 parts of water. The nickel carbonyl feeder was charged with a solution containing 128 parts of nickel carbonyl and 300 parts of methallyl alcohol; addition solution was charged as required.

A flow of acetylene was started at the rate of 27.3 parts per hour and nickel carbonyl solution was fed at the rate of 142 parts per hour. At eleven minutes a brown color appeared, the temperature rose (initially at 29° C.) and absorption of acetylene began. At twenty minutes the temperature had reached 50° C. The flow of acetylene was then raised to a rate of 41.1 parts per hour and carbon monoxide was introduced at a rate of 14.0 parts per hour. The temperature was allowed to rise to 55° C. and was maintained there by cooling. At forty minutes the flow rates of acetylene and carbon monoxide were increased to 45.5 and 18.8 parts per hour, respectively. Nine minutes later absorption of gases ceased and it was necessary to shut off the flow of carbon monoxide and reduce the flow rate of acetylene to 27.3 parts per hour until the stoichiometric reaction had started; the acetylene and carbon monoxide rates were then restored to 41.1 and 14.0 parts per hour, respectively. At sixty minutes water was supplied to the reaction system at the rate of 18 parts per hour. Two additional attempts were made to increase the flow rates as indicated above but without success. The temperature of the reaction mixture was then allowed to rise until it had reached 70° C. At this temperature it was found possible to increase the flow rates, in four stages at intervals of fifteen to twenty minutes, to 60.6 parts of acetylene per hour and 34.2 parts of carbon monoxide per hour, these rates corresponding to 55% carbon monoxide utilization.

With the addition of a feed of methallyl alcohol at the rate of 86 parts per hour, to provide together with the alcohol supplied from the nickel carbonyl feeder a 50% excess of alcohol based on total carbon monoxide available for ester formation, the reaction under the above described conditions could be carried out indefinitely with continuous withdrawal of reaction mixture from the overflow tube.

After six hours of operation a portion of the reaction mixture was treated with acetylene to remove the last traces of nickel carbonyl. The mixture was washed with water to remove nickel salts and with sodium carbonate to remove acidity. The organic layer was distilled and after removal of a forerun containing methallyl alcohol water, and some methallyl acrylate, a main fraction of essentially pure methallyl acrylate was taken at 68–69.5° C./50 mm. The yield of methallyl acrylate was 65%, based on the total carbon monoxide available for ester formation.

*Example 10*

The alcohol used in this preparation was about 82% (by weight) capryl alcohol, the remaining 18% being largely methyl hexyl ketone.

The reaction system, the same as that used in the preparation of n-butyl acrylate, was charged with 365 parts of capryl alcohol, 10 parts of acrylic acid, and 18 parts of water. The nickel carbonyl feeder was charged with a 31.0% (by weight) solution of nickel carbonyl in capryl alcohol.

Acetylene was introduced at the rate of 27.3 parts per hour and nickel carbonyl solution, at the rate of 137 parts per hour. Reaction began in thirty minutes and at thirty five minutes the acetylene feed rate was raised to 41.1 parts per hour and carbon monoxide was introduced at the rate of 14.0 parts per hour, the temperature of the mixture at this time being 37° C. Absorption of gases ceased almost immediately; the carbon monoxide feed was shut off and the acetylene feed rate was decreased to 27.3 parts per hour. When the stoichiometric reaction had started again (in about five minutes), it was allowed to proceed until the temperature had risen to 55° C. At sixty minutes a continuous feed of water was started at the rate of 18 parts per hour. Carbon monoxide was again introduced as above, along with additional acetylene. Thereafter, at intervals of about thirty minutes, the carbon monoxide feed rate was adjusted in the following stages: 18.8, 23.0 and 28.0 parts per hour; the corresponding acetylene feed rates were 45.5, 49.6 and 54.6 parts per hour.

At three hours after starting the initial reactant feeds an additional feed of capryl alcohol was started at the rate of 262 parts per hour to maintain thereafter a constant excess of alcohol. Withdrawal of reaction mixture from the overflow tube began at 4.75 hours.

After a total reaction time of nine hours the nickel carbonyl supply was shut off. Twenty minutes later, when the vent rate started to rise, the flow of carbon monoxide was shut off. Acetylene absorption continued for five minutes. Reaction mixture which had been previously withdrawn was made free of nickel carbonyl by passing in acetylene until it was no longer absorbed.

The reaction mixture was filtered to remove nickel acrylate, present in the form of green crystals. The filtrate, a straw-colored liquid, was washed with water and with sodium carbonate solution. It was then distilled. The yield of capryl acrylate was 69.6%, based on total carbon monoxide available for ester formation.

*Example 11*

The reaction system, the same as that described for the preparation of n-butyl acrylate, was swept with nitrogen and charged with 423 parts of cyclohexanol, 10 parts of acrylic acid, and 18 parts of water. The nickel carbonyl feeder was charged with a 31.3 weight percent solution of nickel carbonyl in methyl ethyl ketone.

Acetylene was introduced at the rate of 27.3 parts per hour and nickel carbonyl at the rate of 42.6 parts per hour. Acetylene absorption started in thirty minutes and at forty minutes the acetylene feed rate was increased to 41.1 parts per hour and a feed of carbon monoxide was started at the rate of 14.0 parts per hour. The temperature which initially was 26° C. was allowed to rise to 55° C. and was maintained there by cooling. At sixty minutes a continuous feed of water was started at the rate of 18 parts per hour. Also beginning at sixty minutes the gas feed rates were increased in stages at intervals of ten minutes. The rates at these various stages were as follows: Acetylene, 45.5, 49.6, 54.6, 60.6 and 68.1 parts per hour; carbon monoxide, 18.8, 23.0, 28.0, 34.2 and 42.0 parts per hour. The final rates corresponded to a carbon monoxide utilization of 60%.

At 135 minutes a flow of cyclohexanol was started at the rate of 352 parts per hour to maintain thereafter a constant, 50% excess of alcohol, based on the total carbon available for ester formation. Overflow of reaction mixture, a green slurry, started at 220 minutes. All feeds were continued for a total reaction period of six hours. The last traces of nickel carbonyl in the reaction mixture were removed by passing in acetylene until absorption ceased.

The reaction mixture was filtered to remove nickel acrylate as a light green, crystalline salt. The filtrate, brownish-green in color, was washed with water and with sodium carbonate solution. Upon distillation a forerun was obtained, containing chiefly cyclohexanol with some cyclohexyl acrylate, and a main fraction consisting of essentially pure cyclohexyl acrylate, distilling at 62°–63° C. under a pressure of 4.5 mm.

Saponification number, 364.2, calculated, 364. Acid number, 0.1, calculated, 0.0. Bromine number, 12.65, calculated, 12.95.

The yield of cyclohexyl acrylate, obtained from both fractions, was 73.5%, based on total carbon monoxide available for ester formation.

*Example 12*

The reaction system, the same as that described in the preparation of n-butyl acrylate, was swept with nitrogen and charged with 360 parts of tertiary amyl alcohol, 10 parts of acrylic acid, and 18 parts of water. The nickel carbonyl feeder was charged with a 31.3 weight percent solution of nickel carbonyl in tertiary amyl alcohol.

A flow of acetylene was started at the rate of 27.3 parts per hour. Nickel carbonyl solution was fed at the rate of 136 parts per hour. The initial temperature was 27° C. Within twenty minutes an exothermic reaction had started, accompanied by formation of a brown color in the mixture. At thirty minutes the acetylene feed was being completely absorbed. The first attempt to introduce carbon monoxide, along with additional acetylene failed but at sixty minutes absorption was essentially complete. At this time a flow of water was started at the rate of 18 parts per hour. At thirty-minute intervals increases were made in the gas feed rates. The acetylene feed rates at these various stages were 41.1, 45.5, 49.6, 54.6, 60.6, 68.1, 78.0 and 82.0 parts per hour; the corresponding carbon monoxide feed rates were 14.0, 18.8, 23.0, 28.0, 34.2, 42.0, 52.1 and 56.0 parts per hour. The final rates given corresponded to 67% carbon monoxide utilization and were reached at 270 minutes after starting the initial feeds. At this time an additional feed of tertiary amyl alcohol was started at the rate of 235 parts per hour. The reaction temperature was held at 55° C. with cooling. Overflow of reaction mixture began at 315 minutes.

After a total reaction period of nine hours the reactant feeds were shut off. Acetylene was passed into the reaction mixture to remove the last traces of nickel carbonyl. The reaction mixture, a green slurry, was then filtered to give a bright green salt cake and an amber colored filtrate. The filtrate was distilled at 34°–67° C./136 mm. to obtain a distillate and leaving behind a residue containing higher-boiling and non-distillable by-products. The distillate contained tertiary amyl alcohol, tertiary amyl acrylate and free acrylic acid. The distillate was washed with water and with sodium carbonate solution to remove tertiary amyl alcohol and the acrylic acid. A redistillation then gave a main fraction of essentially pure tertiary amyl acrylate, boiling point 58°–60° C./36 mm. It had a saponification number of 398 (calculated 395) and an acid number of 1.2 (calculated 0).

The total yield of tertiary amyl acrylate was 51.7%, based on total carbon monoxide available for ester formation.

*Example 13*

The alcohol used in this preparation was a mixture of terpene alcohols, containing a minimum of 95% by weight α-terpineol. The reaction system, the same as that described for the preparation of n-butyl acrylate was swept with nitrogen and charged with 418 parts of α-terpineol, 36 parts of acrylic acid, and 18 parts of water. The nickel carbonyl feeder was charged with a solution containing 257 parts of nickel carbonyl and 654 parts of α-terpineol.

Acetylene was passed into the charge at the rate of 27.3 parts per hour and the nickel carbonyl feeder was started at the rate of 42.6 parts of nickel carbonyl per hour. In thirteen minutes absorption of acetylene began accompanied by a rise in temperature and appearance of a brown color in the mixture. At twenty minutes carbon monoxide was introduced at the rate of 14.0 parts per hour and the acetylene feed rate was simultaneously raised to 41.1 parts per hour. These rates were increased in three stages at ten-minute intervals to 54.6 and 28.0 parts per hour respectively. The temperature, initially at 28° C., was at first allowed to rise and was then held at 55° C. with cooling. At sixty minutes a flow of water was started and maintained thereafter at the rate of 18 parts per hour. At thirty-minute intervals the gas feed rates were again raised in two stages, the final rates at 120 minutes, being 68.1 parts per hour of acetylene and 42.0 parts per hour of carbon monoxide. At this time a feed of α-terpineol, in addition to that supplied with the nickel carbonyl, was started at the rate of 356 parts per hour. At 220 minutes continuous withdrawal of reaction mixture was started from the overflow tube.

At the end of six hours the nickel carbonyl feeder was shut off. Absorption of the gas feeds continued for ten minutes, when the carbon monoxide supply was shut off. Ten minutes later absorption of acetylene ceased and the reaction vessel was drained. The reaction mixture which had been previously withdrawn during continuous operation of the reaction was now returned to the reaction system for removal of the last traces of nickel carbonyl by passing in acetylene until absorption of gas and exothermic reaction ceased.

The reaction mixture was washed with water to remove nickel acrylate and then with sodium carbonate solution to remove acrylic acid. Considerable amounts of sodium carbonate were required, indicating the presence of much free acrylic acid. Distillation of the washed organic layer yielded a mixture of α-terpinyl acrylate and α-terpineol; there was no evidence of dehydration products of α-terpineol. The amount of ester present was determined from saponification numbers. The yield of α-terpinyl acrylate, based on total carbon monoxide available for ester formation, was 43.5%. After fractional distillation a sample was obtained for purposes of identification having the following properties: boiling point 71°–73° C./0.15 mm.; saponification number, 269; acid number, 0.0; bromine number, 18.15; calculated values, 269, 0.0 and 19.2, respectively.

We claim:

1. A process for preparing acrylic esters which comprises reacting together between 30° and 90° C. acetylene, nickel carbonyl, an acid which forms a nickelous salt from the nickel carbonyl in the reaction mixture and which makes available for reaction the carbonyl therefrom, the acid being used in a proportion sufficient to initiate reaction, and a monohydric alcohol of three to twelve carbon atoms, and, while these substances are reacting, passing into the reaction mixture and there reacting between 30° and 90° C. acetylene, carbon monoxide, nickel carbonyl, water, and a said alcohol.

2. A process for preparing acrylic esters which comprises bringing together and reacting at a temperature between 30° and 90° C. acetylene, nickel carbonyl, a lower aliphatic monocarboxylic acid in a proportion approximately equivalent to the nickel carbonyl, and a monohydric alcohol ROH, in which R is hydrocarbon residue of three to twelve carbon atoms, and, while these substances are reacting, bringing into the reaction mixture and there reacting at a temperature between 30° and 90° C. acetylene, carbon monoxide, nickel carbonyl, water, and a said alcohol.

3. A process for preparing acrylic esters which comprises bringing together and reacting between 30° and 90° C. acetylene, nickel carbonyl, a lower aliphatic monocarboxylic acid in a proportion approximately equivalent to the nickel carbonyl, and a monohydric alcohol ROH, in which R is a hydrocarbon residue of three to twelve carbon atoms, and while these substances are reacting, bringing into the reaction mixture and there reacting between 40° and 60° C. acetylene, carbon monoxide, nickel carbonyl, water, and a said alcohol, the ratio of the carbon monoxide to the carbon monoxide of the nickel carbonyl being between 20:80 and 70:30, the acetylene being supplied in a proportion of 0.9 to 1.1 moles per carbonyl group, and the water being supplied in excess of the total carbonyl.

4. A process for preparing acrylic esters which comprises reacting together between 30° and 90° C. acetylene, nickel carbonyl, a lower monocarboxylic aliphatic acid in a proportion approximately equivalent to the nickel carbonyl, and an alcohol from the class consisting of allylically unsaturated monohydric alcohols of not over 12 carbon atoms, tertiary alkanols, and terpineols and passing into the resulting reaction and there reacting between 30° and 90° C. acetylene, carbon monoxide, nickel carbonyl, water, and a said alcohol.

5. A process for preparing acrylic esters which comprises reacting between 30° and 90° C. acetylene, nickel carbonyl, acrylic acid in a proportion approximately equivalent to the nickel carbonyl, and an alcohol from the class consisting of allylically unsaturated monohydric alcohols of not over 12 carbon atoms, tertiary alkanols, and terpineols and passing into the resulting reaction mixture and there reacting together between 30° and 90° C. acetylene, carbon monoxide, nickel carbonyl, water, and a said alcohol, the ratio of carbon monoxide to the carbon monoxide of the nickel carbonyl being from 20:80 to 70:30, the acetylene being supplied from about 0.9 to 1.1 moles per carbonyl group, and the water being supplied in a proportion at least equivalent to the nickel carbonyl.

6. A process for preparing acrylic esters of allylically unsaturated alcohols which comprises reacting between 30° and 90° C. acetylene, nickel carbonyl, acrylic acid in a proportion approximately equivalent to the nickel carbonyl, and an allylically unsaturated alcohol of not over 12 carbon atoms and passing into the resulting reaction mixture and there reacting together between 30° and 90° C. acetylene, carbon monoxide, nickel carbonyl, water, and a said alcohol, the ratio of carbon monoxide to the carbon monoxide of the nickel carbonyl being from 20:80 to 70:30, the acetylene being supplied from about 0.9 to 1.1 moles per carbonyl group, and the water being supplied in a proportion at least equivalent to the nickel carbonyl.

7. The process of claim 3 in which the alcohol is allyl alcohol.

8. The process of claim 3 in which the alcohol is 2-methallyl alcohol.

9. A process for preparing acrylic esters of tertiary alkanols which comprises reacting between 30° and 90° C. acetylene, nickel carbonyl, acrylic acid in a proportion approximately equivalent to the nickel carbonyl, and a tertiary alkanol and passing into the resulting reaction mixture and there reacting together between 30° and 90° C. acetylene, carbon monoxide, nickel carbonyl, water, and a said alcohol, the ratio of carbon monoxide to the carbon monoxide of the nickel carbonyl being from 20:80 to 70:30, the acetylene being supplied from about 0.9 to 1.1 moles per carbonyl group, and the water being supplied in a proportion at least equivaalent to the nickel carbonyl.

10. The process of claim 9 in which the alcohol is tertiary butyl alcohol.

11. The process of claim 9 in which the alcohol is tertiary amyl alcohol.

12. A process for preparing an acrylic ester of α-terpineol which comprises reacting between 30° and 90° C. acetylene, nickel carbonyl, acrylic acid in a proportion approximately equivalent to the nickel carbonyl, and α-terpineol and passing into the resulting reaction mixture and there reacting together between 30° and 90° C. acetylene, carbon monoxide, nickel carbonyl, water, and α-terpineol, the ratio of carbon monoxide to the carbon monoxide of the nickel carbonyl being from 20:80 to 70:30, the acetylene being supplied from about 0.9 to 1.1 moles per carbonyl group, and the water being supplied in a proportion at least equivalent to the nickel carbonyl.

References Cited in the file of this patent

UNITED STATES PATENTS

| | | |
|---|---|---|
| 2,582,911 | Neher | Jan. 15, 1952 |
| 2,653,969 | Albrecht et al. | Sept. 29, 1953 |

OTHER REFERENCES

Copenhaver et al.: "Acetylene and Carbon Monoxide Chemistry" (Reinhold Publishing Corp. 1949), pp. 247–57.